UNITED STATES PATENT OFFICE.

FRANZ WOLF-BURCKHARDT, OF BIEBRICH, AND WILHELM BORCHERS, OF AACHEN, GERMANY, ASSIGNORS TO ZIRKONGLAS GESELLSCHAFT M. B. H., OF WEISS-FRAUENHOF, FRANKFORT-ON-THE-MAIN, GERMANY.

VITREOUS SUBSTANCE.

1,086,113.      Specification of Letters Patent.      Patented Feb. 3, 1914.

No Drawing.      Application filed November 9, 1911. Serial No. 659,305.

*To all whom it may concern:*

Be it known that we, FRANZ WOLF-BURCKHARDT, chemist, a subject of the King of Prussia, and resident of Biebrich-on-the-Rhine, Germany, and WILHELM BORCHERS, chemist, a subject of the King of Prussia, and resident of 15 Ludwigsallee, city of Aachen, Germany, have jointly invented a new and useful Improved Vitreous Substance, of which the following is a specification.

This invention relates to the production of a new or improved vitreous substance of the nature of quartz glass but of greater strength and less liable to devitrification and deformation when subjected to heat.

Quartz glass, as is well known, is obtained by melting pure natural quartz or silica free from water, which gives a vitreous substance having all the outward properties of glass but being different therefrom in its chemical composition, being a substance of pure acid character possessing great durability against chemical and thermal influences. Quartz glass, however, when subjected to high temperatures, tends to devitrify, that is to say, it transforms from the amorphous state into a crystalline state, in which condition it considerably diminishes in strength and may be crushed between the fingers. Moreover, when quartz is gradually heated to fusing point, it is found that it begins to soften at a temperature of about 1700° centigrade, which is somewhat below that of its fusing point. As soon as the softening point is reached, the quartz glass rapidly deforms, that is to say, rapidly loses its shape, and for these reasons quartz glass has been found deficient for many practical purposes.

The object of the present invention is therefore to produce a vitreous substance which, while possessing all the good qualities of quartz glass, will be of greater strength, being less liable to devitrification and deformation, thus enabling articles to be manufactured therefrom which shall be excellently durable against thermal influences.

According to the present invention, small quantities of one or more of the acidic oxids of the fourth group of the periodic system are incorporated with the quartz glass during its manufacture. These acidic oxids are very durable against chemical and thermal influences, but, of these oxids, the titanic and zirconium oxids are most suitable because of their high melting point and because their resistance to acids closely approximates that of silica. The oxids dissolve in the molten silica or form silicates therewith which dissolve in the excess molten silica and, owing to their high melting points, the fusing point of the mixture will vary but little and may even exceed that of pure quartz glass. It has been found preferable not to add more than 5 per cent. of these oxids and that when the oxids are added to the silica in from fractions of one per cent. to about 5 per cent., the liability of the product to devitrify is considerably less than that of pure quartz glass while, at the same time, the softening point is slightly higher than that of quartz glass and that when this softening point is reached, the product does not deform as rapidly as does pure quartz glass. The product is also capable of withstanding greater breaking strains and is also of greater durability against chemical influences than pure quartz glass.

It will be understood that either titanic oxid or ziconium oxid or both may be mixed with the silica prior to fusion.

The mixture of the silica and oxids may be fused in an electric furnace or by means of an oxy-hydrogen or oxy-coal gas flame or the like. The vitreous substance thus obtained may be worked and treated in the ordinary manner.

We claim:—

1. As a new composition of matter, a vitreous substance of the nature of quartz glass and derived from silica and a small quantity, not exceding 5 per cent. of an acidic oxid of the fourth group of the periodic system, characterized by its durability against devitrification and deformation and its capability of withstanding breaking strains and chemical influences.

2. As a new composition of matter, a vitreous substance of the nature of quartz glass and derived from silica and a small quantity, not exceeding 5 per cent., of a plurality of acidic oxids of the fourth group of the periodic system, characterized by its durability against devitrification and defomation and its capability of withstanding breaking strains and chemical influences.

3. As a new composition of matter, a vitreous substance of the nature of quartz glass and derived from silica and a small quantity, not exceeding 5 per cent., of zirconium oxid, characterized by its durability against devitrification and deformation and its capability of withstanding breaking strains and chemical influences.

4. As a new composition of matter, a vitreous substance of the nature of quartz glass and derived from silica and a small quantity, not exceeding 5 per cent., of titanic oxid and zirconium oxid, characterized by its durability against devitrification and deformation and its capability of withstanding breaking strains and chemical influences.

In witness whereof we have hereunto set our hands in the presence of two witnesses.

FRANZ WOLF-BURCKHARDT.
WILHELM BORCHERS.

Witnesses:
JAKOB KANSSEN,
HENRY QUADFLIEG.